United States Patent
Böhm et al.

(10) Patent No.: US 11,273,018 B2
(45) Date of Patent: Mar. 15, 2022

(54) MULTI-COLOURED MILLING BLANK FOR IMPLANT-SUPPORTED DENTAL PROSTHETIC RESTORATIONS

(71) Applicant: Kulzer GmbH, Hanau (DE)

(72) Inventors: Uwe Böhm, Bad Homburg (DE); Mario Beyer, Bad Homburg (DE)

(73) Assignee: Kulzer GmbH, Hanau (DE)

( * ) Notice: Subject to any disclaimer, the term of this patent is extended or adjusted under 35 U.S.C. 154(b) by 297 days.

(21) Appl. No.: 16/330,558

(22) PCT Filed: Sep. 1, 2017

(86) PCT No.: PCT/EP2017/071974
§ 371 (c)(1),
(2) Date: Mar. 5, 2019

(87) PCT Pub. No.: WO2018/042001
PCT Pub. Date: Mar. 8, 2018

(65) Prior Publication Data
US 2020/0297464 A1    Sep. 24, 2020

(30) Foreign Application Priority Data
Sep. 5, 2016   (DE) .......................... 102016116546.8

(51) Int. Cl.
*A61C 13/00*    (2006.01)
*A61C 8/00*    (2006.01)
(Continued)

(52) U.S. Cl.
CPC ........ *A61C 13/0022* (2013.01); *A61C 8/0063* (2013.01); *A61C 8/0068* (2013.01); *A61C 13/083* (2013.01); *A61C 13/09* (2013.01)

(58) Field of Classification Search
CPC ... A61C 13/0022; A61C 13/083; A61C 13/09; A61C 8/0063; A61C 8/0068; A61C 8/006; A61C 8/005
(Continued)

(56) References Cited

U.S. PATENT DOCUMENTS

| | | | |
|---|---|---|---|
| 5,104,318 A | * | 4/1992 | Piche ................... A61C 8/0068 433/173 |
| 8,962,146 B2 | | 2/2015 | Giordano |

(Continued)

FOREIGN PATENT DOCUMENTS

| | | |
|---|---|---|
| DE | 10 2012 108 153 A1 | 9/2012 |
| DE | 10 2013 102 402 A1 | 3/2013 |

(Continued)

OTHER PUBLICATIONS

International Search Report corresponding to International Application No. PCT/EP2017/071974 dated Oct. 17, 2017.
(Continued)

*Primary Examiner* — Matthew M Nelson
(74) *Attorney, Agent, or Firm* — Jenkins, Wilson, Taylor & Hunt, P.A.

(57) ABSTRACT

Dental blank for the production of a dental prosthetic restoration, in particular of a multi-coloured dental prosthetic restoration, by processing removing the outer region of the blank, comprising (i) an inner connecting element having an preferably peg-shaped scaffold region in the direction of the coronal region of the dental blank and an implant connection geometry in the radicular direction of the dental blank, (ii) wherein the scaffold region of the connecting element is connected to a dentin scaffold region in the direction of the coronal region of the blank, and wherein (iii) the dentin scaffold region is connected to an (iv) outer region of the blank in the region of enamel in the direction of the (Continued)

coronal region of the blank, and wherein (v) the dental blank has an inner elongated lumen for fastening of the produced dental prosthetic restoration on an implant or abutment by means of a connecting screw or a bolt. Moreover, a subject matter of the invention is a system for the production of a dental blank as well as the method for the production of the blank.

20 Claims, 2 Drawing Sheets

(51) Int. Cl.
 *A61C 13/083* (2006.01)
 *A61C 13/09* (2006.01)
(58) Field of Classification Search
 USPC .................................................... 433/202.1
 See application file for complete search history.

(56) References Cited

U.S. PATENT DOCUMENTS

| | | | | |
|---|---|---|---|---|
| 9,901,426 | B2* | 2/2018 | Reinshagen | C03B 19/06 |
| 2008/0274440 | A1* | 11/2008 | Smith | A61C 8/0069 |
| | | | | 433/174 |
| 2011/0045436 | A1* | 2/2011 | Rusin | A61C 13/0022 |
| | | | | 433/173 |
| 2012/0251979 | A1* | 10/2012 | Karim | A61C 8/0051 |
| | | | | 433/201.1 |
| 2015/0216635 | A1* | 8/2015 | Schweiger | F16B 33/004 |
| | | | | 433/173 |
| 2015/0289954 | A1* | 10/2015 | Chang | A61C 13/0004 |
| | | | | 433/29 |
| 2016/0113845 | A1* | 4/2016 | Fecher | C03B 19/06 |
| | | | | 501/32 |
| 2017/0360535 | A1* | 12/2017 | Rynerson | G05B 19/4099 |
| 2018/0318053 | A1* | 11/2018 | Morman | A61C 13/0006 |

FOREIGN PATENT DOCUMENTS

| | | | |
|---|---|---|---|
| DE | 10 2013 014 660 A1 | 9/2013 | |
| EP | 2930156 A1 * | 10/2015 | ............. C03C 3/062 |
| WO | WO2010/032987 | 3/2010 | |
| WO | WO-2012080513 A1 * | 6/2012 | ............. A61K 6/838 |
| WO | WO2015/001088 A1 | 1/2015 | |

OTHER PUBLICATIONS

International Preliminary Report on Patentability corresponding to International Application No. PCT/EP2017/071974 dated Mar. 5, 2019.

Written Opinion of the ISA corresponding to International Application No. PCT/EP2017/071974 dated Mar. 8, 2018. (English Translation dated Jan. 7, 2019).

Decision to Grant for European Patent Application Serial No. 17761081 dated Aug. 5, 2021.

* cited by examiner

MULTI-COLOURED MILLING BLANK FOR IMPLANT-SUPPORTED DENTAL PROSTHETIC RESTORATIONS

Dental blank for the production of a dental prosthetic restoration, in particular of a multi-coloured dental prosthetic restoration, by removing processing the outer region of the blank, comprising (i) an inner connecting element having an preferably peg-shaped scaffold region in the direction of the coronal region of the dental blank and an implant connection geometry in the radicular direction of the dental blank, (ii) wherein the scaffold region of the connecting element is connected to a dentin scaffold region in the direction of the coronal region of the blank, and wherein (iii) the dentin scaffold region is connected to an (iv) outer region of the blank in the region of enamel in the direction of the coronal region of the blank, and wherein (v) the dental blank has an inner elongated lumen for fastening of the produced dental prosthetic restoration on an implant or abutment by means of a connecting screw or a bolt. Moreover, a subject matter of the invention is a system for the production of a dental blank as well as the method for the production of the blank.

For the production of dental prosthetic implant or tooth stump-supported restorations, it is known to produce bridges, crown copings or dental scaffold structures, which are subsequently provided with a tooth-coloured veneering, from milling blanks in a removing process. Up to now, the dental prosthetic restorations produced in a removing process are produced from monoblocs with a support for the milling machine, clamped into the milling machine, or from round milling blanks, e.g. from cylindrical plates. Usually, a variety of prosthetic restorations is produced from round milling blanks. Usually, removing processing of round milling blanks is carried out in decentralized way in a milling center having appropriate CAD/CAM devices.

CAD/CAM processes are computer-aided production processes of i.e, aesthetic prosthetic dental restorations, such as bridges and crowns. In this context, in CAD/CAM, the English abbreviation CAD means Computer Aided Design and CAM means Computer Aided Manufacturing.

Like this, 3D workpieces are produced from the CAD data in a CAM process in automated material-removing processes, hereinafter also referred to as removing processes only. Usual removing processes comprise milling, drilling, cutting, chipping, polishing, melting and/or at least two of the removing process steps. Besides known CAD/CAM processes, in the future, so-called laser milling, material removal by means of laser beams, may be used for processing of blanks for the production of prosthetic dental restorations. The material properties of the blanks have to be specifically adapted to the laser milling process in order to achieve the desired results.

It was an object of the invention to enable a decentralized production of dental prosthetic restorations which, preferably at the same time, aesthetically correspond very well to a natural tooth. Preferably, material-removing processing of a milling blank shall be enabled in a significantly more economic process in which production, processing and adjustment of the dental prosthetic restoration may preferably be carried out within a single treatment date. In particular, the processing properties of the blank in relation to fracture strength and/or E-modulus shall be very well.

The objects of the invention are solved by the dental blank according to the invention, in particular a dental milling blank, according to claim 1, in particular a blank having an outer region made of a polymer-filled hybrid ceramic, as well as by the method for the production of the blank according to claim 10, as also the system for the production of a blank according to claim 13. Preferred embodiments of the blank are shown in the subclaims and, in more detail, in the description.

Like this, the preferred alternative of the blank according to the invention having an outer region made of a hybrid ceramic shows significantly improved material properties compared to unfilled fully ceramic milling blanks which may be milled to blanks of prosthetic moulded parts in CAD/CAM processes.

Subject matter of the invention is a dental blank, in particular a milling blank, for the production of a dental prosthetic restoration, such as a single-tooth restoration supported by implant and optionally abutment, e.g. a crown, preferably a multi-coloured dental prosthetic restoration, by material-removing processing of the blank, in particular the outer region of the blank, comprising (i) an inner connecting element having a scaffold region in the direction of the coronal region of the dental blank, in particular a peg-shaped, preferably integrally scaffold region, and having an implant connection geometry in the radicular direction of the dental blank, in particular the connecting element is made of a metal or a metal alloy, preferably made of titanium, a titanium ally, gold, a gold alloy or made of cobalt chromium, (ii) wherein the scaffold region of the connecting element is connected to a dentin scaffold region in the direction of the coronal region of the blank, and wherein (iii) the dentin scaffold region is connected to an (iv) outer region of the blank in the direction of the coronal region of the blank, and (v) the dental blank has an elongated lumen within the implant connection geometry in the inner connecting element and, optionally, within the scaffold region of the inner connecting element, which extends from the top side to the bottom side of the implant connection geometry of the inner connecting element and, optionally, from the top side to the bottom side of the scaffold region, and wherein the lumen has an opening in crestal or lingual direction and an opening in radicular direction.

According to an alternative, the lumen is substantially cylindrical for receiving of a connecting screw or is formed as an elongated lumen having an arched run and, optionally, having threaded parts in radicular direction. An arched run of the lumen is understood to mean a lumen having more than one longitudinal center line. For example, the lumen may have longitudinal center axes area by area, wherein the longitudinal center axes are in an angel against each other unequal to 0° or unequal to 180°.

The outer region of the blank corresponds to the region of enamel of a natural tooth. The inner connection element is preferably arranged in the cervical region of the dental prosthetic restoration and preferably is peg-shaped. According to a further preferred alternative, the inner connection element is integral.

The scaffold region may be connected to the dentin scaffold region in a detachable or non-detachable manner. Like this, the connection between the scaffold region and the dentin region may be carried out in a positive-locking, force-fitted or also firmly bonded manner or comprise a combination thereof. Likewise, the dentin scaffold region may be connected to the outer region in a detachable or non-detachable manner. Like this, here again, the connection between the dentin scaffold region and the outer region may be carried out in a positive-locking, force-fitted or also firmly bonded manner or comprise a combination thereof.

Another subject matter of the invention is a blank, in particular a milling blank, wherein the dental blank has an elongated lumen which extends from the top side of the outer region to the bottom side of the implant connection geometry of the connecting element, and wherein the lumen extends through the inner connecting element comprising the connection geometry and the scaffold region, the dentin scaffold region and the outer region and has an opening in crestal or lingual direction and an opening in radicular direction.

Moreover, the dental blank may have an elongated lumen which extends from the top side of the outer region to the bottom side of the implant connection geometry of the connecting element, wherein the lumen extends through the inner connecting element, the dentin scaffold region and the outer region and has an opening in crestal or lingual direction and an opening in radicular direction and the outer region encases the dentin scaffold region cervically or in the cervical region. Moreover, it is preferred for the dentin scaffold region to encase the scaffold region cervically or in the cervical region.

Thus, subject matter of the invention may also be a blank having an elongated lumen which extends from the top side to the bottom side of the outer region, from the top side to the bottom side of the dentin scaffold region and from the top side to the bottom side of the connecting element such that the lumen extends through the inner connecting element, the dentin scaffold region and the outer region and has an opening in crestal or lingual direction on the top side of the outer region and an opening in radicular direction on the bottom side of the implant connection geometry.

According to a preferred alternative, subject matter of the invention is a dental blank comprising an elongated lumen which extends from the top side of the outer region to the bottom side of the implant connection geometry of the connecting element, in particular the lumen extend through the whole inner connecting element, the dentin scaffold region and the outer region and has an opening in crestal or lingual direction and an opening in radicular direction, wherein the elongated lumen a) may have at least one longitudinal axis, in particular the elongated lumen may (a.1) be rotationally symmetric to its one longitudinal axis, and or (a.2) the elongated lumen may have longitudinal center axes area by area and the lumen may preferably be arched, e.g. having not changing diameters, and/or (b) the elongated lumen may be angled and may have at least two intersecting longitudinal axes, and/or (c) the elongated lumen may be arched, e.g. having changing diameters, and/or (d) the opening of the elongated lumen in crestal or lingual direction, in particular on the top side of the outer region, the top side of the dentin scaffold region and/or the top side of the scaffold region, may have at least a greater diameter than the opening, in particular at the bottom side of the implant connection geometry of the inner connecting element, in radicular direction.

According to the invention, the lumen has a diameter being suitable for receiving a connecting screw or a bolt for fastening the prosthetic restoration on an implant. Optionally, the lumen may additionally have threaded parts.

Another subject matter of the invention is a blank having (i) an inner connecting element which comprises the scaffold region and the implant connection geometry, wherein the connecting element is made of at least one metal or metal alloy, preferably the inner connecting element is made of titanium, a titanium alloy, gold, a gold alloy or made of a cobalt-chromium alloy, Particularly preferably, the connecting element is made of a titanium alloy, gold alloy or cobalt-chromium alloy. Preferably, the connecting element is integrally made of a metal or a metal alloy.

Moreover, it is preferred for the blank being made in (iii) the dentin scaffold region of a metal oxide or metal oxide mixture, optionally having a magnesium oxide (MgO) content and/or ytterbium oxide ($Y_2O_3$) content. Preferably, the blank in (iii) the dentin scaffold region may be made of a metal oxide or metal oxide mixture, wherein the metal oxide or the metal oxide mixture may be selected from zirconium oxide, aluminum oxide or a zirconium oxide/aluminum oxide mixture, having, each independently from each other, a magnesium oxide (MgO) content and/or ytterbium oxide ($Y_2O_3$) content.

According to an alternative, the dentin scaffold region or also the outer region of the blank may be made of a metal oxide or metal oxide mixture or of an open-pored ceramic scaffold, wherein the open-pored porosity of the ceramic scaffold may be from 10 to 80% by weight, in particular from 20 to 70% by weight, preferably from 30 to 60% by weight, in particular the open-pored ceramic scaffold may be filled with 20 to 90% by weight, in particular with 30 to 80% by weight, preferably with 40 to 70% by weight, of at least one polymer, based on the total composition. According to the invention, the open-pored ceramic scaffold may be filled with a polymer in order to improve, in particular, the processing properties of the ceramic scaffold in material-removing processes.

The dentin scaffold region or the open-pored ceramic scaffold of the outer region may preferably comprise or consist of zirconium dioxide, aluminum oxide, silicate mineral, preferably feldspar, mixed oxide(s) comprising zirconium dioxide and aluminum oxide and/or silicon carbide, Zirconium dioxide is particularly preferred, in particular having a zirconium dioxide content of greater than or equal to 50% by weight, in particular having a zirconium dioxide content of greater than or equal to 70% by weight. Aluminum dioxide having a content of greater than or equal to 95% by weight, in particular greater than or equal to 99.7% by weight, particularly preferably greater than or equal to 99.99% by weight, is alternatively preferred. Furthermore, particularly preferred ceramic scaffolds having a zirconium dioxide content of greater than or equal to 50 to 100% by weight, optionally additionally comprising magnesium, such as (Mg-PSZ, partially stabilized), MgO, zirconium dioxide (Y-TZP, partially stabilized) comprising $Y_2O_3$, zirconium dioxide HIP state (Y-TZP, partially stabilized) comprising $Y_2O_3$, $ZrO_2/Al_2O_3$ mixed oxides, SISIC a silicon carbide infiltrated by silicon, silicon carbide sintered without free silicon, hot pressed silicon carbide without free silicon. Ceramic scaffolds having a zirconium dioxide content, aluminum oxide content, mixed oxide content comprising zirconium dioxide and/or silicon carbide of greater than or equal to 70% by weight to 100% by weight, in particular greater than or equal to 73% by weight, preferably greater than or equal to 85% by weight, greater than or equal to 90% by weight, wherein the scaffold is preferably stabilized by an yttrium compound and/or magnesium oxide.

According to a preferred alternative, the dentin scaffold region may comprise a metal oxide or metal oxide mixture, in particular comprising a zirconium dioxide content of 50 to 100% by weight, in particular of 70 to 100% by weight, preferably of 85 to 100% by weight, particularly preferably of 90 to 100% by weight, and optionally comprising a content of at least one other metal oxide, metalloid oxide and/or silicon carbide, in particular of one of the aforementioned oxides or mixtures thereof selected from yttrium, aluminum, magnesium, potassium, calcium, lithium, and optionally silicon, having a content of 0 to 50% by weight, in particular of 0 to 30% by weight, preferably of 0 to 15% by weight, particularly preferably of 0 to 10% by weight, wherein the total composition amounts to 100% by weight. Yttrium oxide, in particular $Y_2O_3$, MgO, $Al_2O_3$, is preferred as other metal oxides and metal oxide mixtures, in particular having a content of 0 to 50% by weight, in particular of 0 to 30% by weight, preferably of 0 to 15% by weight, particularly preferably of 0 to 10% by weight.

According to a preferred alternative, the outer region may comprise a ceramic scaffold, in particular the outer region comprises an open-pored ceramic scaffold, preferably a dental hybrid ceramic having a polymer content, in particular comprising a zirconium dioxide content and/or feldspar content of 50 to 99.9% by weight, in particular of 70 to 99.9% by weight, preferably of 85 to 99.9% by weight, particularly preferably of 90 to 99.9% by weight or of 50 to 97% by weight, and optionally comprising a content of other metal oxides, metalloid oxides, silicon carbide, in particular of one of the afore-mentioned, or mixtures thereof, wherein the metals of the other metal oxide, metalloid oxide and/or silicon carbide are selected from yttrium, aluminum, magnesium, potassium, calcium, lithium, and optionally silicon, having a content of 0.1 to 50% by weight or of 3 to 50% by weight, in particular of 0.1 to 30% by weight, preferably of 0.1 to 15% by weight, particularly preferably of 0.1 to 10% by weight, of the other metal oxide, metal oxides, metalloid oxides, silicon carbide, wherein the total composition of the ceramic scaffold amounts to 100% by weight. Particularly preferably, the outer region is a ceramic scaffold comprising an open-pored ceramic scaffold, preferably a dental hybrid ceramic having polymer content, preferably the ceramic scaffold comprises a zirconium dioxide content of 50 to 99.9% by weight, in particular of 70 to 99.9% by weight, preferably of 85 to 99.9% by weight, particularly preferably of 90 to 99.9% by weight or of 50 to 97% by weight, and having a content of 0.1 to 50% by weight or of 3 to 50% by weight, in particular of 0.1 to 30% by weight, preferably of 0.1 to 15% by weight, particularly preferably of 0.1 to 10% by weight, of at least one other metal oxide, metal oxides, metalloid oxides, silicon carbide, wherein the total composition of the ceramic scaffold amounts to 100% by weight. Preferably, the outer region comprises a hybrid ceramic comprising from 50 to 98% by weight of a ceramic scaffold, in particular 80 to 90% by weight, and 2 to 50% by weight of polymer content, in particular 10 to 20% by weight, wherein the total composition of the hybrid ceramic amounts to 100% by weight.

A particularly preferred dentin scaffold region according to the invention comprises a metal oxide or metal oxide mixture or the outer region comprises a ceramic scaffold, in particular the outer region comprises an open-pored ceramic scaffold, comprising a zirconium dioxide content and/or feldspar content of 50 to 98% by weight, in particular of 70 to 98% by weight, as well as optionally an yttrium oxide content, in particular yttrium(III) oxide, of 0.01 to 20% by weight, in particular of 0.1 to 15% by weight, particularly preferably of 1 to 15% by weight, as well as, optionally or alternatively, having a magnesium oxide content of 0.01 to 10% by weight, in particular of 0.1 to 5% by weight, and/or optionally having an aluminum oxide content, in particular $Al_2O_3$, of 0.01 to 30% by weight, in particular of 0.1 to 25% by weight, wherein the total content amounts to 100% by weight. Typical ceramic scaffolds according to the invention comprise $ZrO_2/Y_2O_3$ having a $ZrO_2$ content of 95% by weight and 5% by weight $Y_2O_3$ or $ZrO_2/Y_2O_3/Al_2O_3$ having a content of approximately 95% by weight $ZrO_2$ and approximately 4.75% by weight $Y_2O_3$ and approximately 0.25% by weight $Al_2O_3$; $ZrO_2/Al_2O_3/Y_2O_3$ having a content of approximately 76% by weight $ZrO_2$ and 20% by weight $Al_2O_3$ and 4% by weight $Y_2O_3$; $ZrO_2/Y_2O_3$ having a content of approximately 90% by weight $ZrO_2$ and 10% by weight $Y_2O_3$; $ZrO_2/MgO$ having a content of approximately 96.5% by weight $ZrO_2$ and 3.5% by weight MgO. A likewise preferred open-pored scaffold, in particular as component for the production of a hybrid ceramic or in a hybrid ceramic, is made of feldspar. A hybrid ceramic, in particular for the production of the outer region, may be produced or an appropriate hybrid ceramic is obtainable by infiltration with a polymerisable monomer, in particular with UDMA and/or TEGDMA, and polymerisation.

According to a particularly preferred alternative, (iv) the outer region of the blank may be made of a dental composite material, optionally a glass ceramic of a specific composition; a dental ceramic, such as an open-pored ceramic, or a hybrid ceramic, in particular a dental hybrid ceramic having polymer content, particularly preferably a hybrid ceramic having an open-pored ceramic scaffold having polymer content. The open-pored ceramic scaffold may preferably have the afore-mentioned or below-mentioned composition. The polymer content preferably comprises the below-mentioned polymer components.

Moreover, it is preferred for the (iv) outer region of the dental blank to be made of A) a dental composite material comprising (a) 40 to 80% by weight inorganic fillers, in particular comprising dental glasses; in particular barium glass powder and/or strontium glass powder, barium aluminum fluorosilicate dental glasses; and/or also calcium carbonate (so-called "whisker")

(b) 60 to 20% by weight of at least one polymer component being based on polymerisation of at least one monomer or monomer mixture comprising urethane (meth)acrylate, such as UDMA (diurethane dimethacrylate), tricyclo [5.2.1.02.6]decane (TCD) urethane derivative, TCD-di-HEA (Bis(acryloyloxymethyl) tricyclo[5.2.1.02.6]decane), in particular 2-propenoic acid, (octahydro-4,7-methane-1H-indene-5-diyl) bis(methyleneiminocarbonyloxy-2,1-ethanediyl)ester), TCD-di-HEMA (Bis(methacryloyloxymethyl) tricyclo[5.2.1.0$^{2,6}$]decane-HEMA (HEMA: 2-hydroxyethyl methacrylate), the methylacrylate derivative of TCD-di-HEA, and/or TEGDMA (triethyleneglycol dimethacrylate) and, optionally, at least one threefold, fourfold or fivefold crosslinker, or B) a lithium silicate as dental glass ceramic, or C) a hybrid ceramic, in particular a dental hybrid ceramic, having polymer content, preferably a dental hybrid ceramic, wherein the ceramic content preferably is an open-pored ceramic scaffold. The pores of the open-pored ceramic scaffold are preferably filled with a polymer and form the polymer content.

According to an embodiment, the inorganic fillers in the composite material may comprise dental glasses, which may comprise different particle-size fractions, such as coarse-grained dental glasses and fine-grained dental glasses as well as, optionally, dental glasses having a mean particle size. In general, the particle size distribution may be from 5 nm to 20 µm. Preferably, the average particle size of the coarse-grained dental glasses is from 5 to 10 µm, in particular about 7 µm, and the average particle size of the fine-grained dental glasses is from 0.5 to 2 µm, in particular about 1 µm. Optionally, addition dental glasses of an average particle size of 2 to 5 µm and/or also very coarse-grained dental glasses having a particle size of 10 to 50 µm may be used.

The preferred flexural strength of the composite material is 145 to 169 MPA according to DIN EN 4049:2009.

The following composition of lithium silicate is preferred according to the invention:

55 to 70% by weight $SiO_2$, 10 to 15% by weight $LiO_2$, 10 to 20% by weight of the stabilizer selected from the group consisting of $ZrO_2$, $HfO_2$ or mixtures thereof, 0.1 to 5% by weight $K_2O$, 0.1 to 5% by weight $Al_2O_3$, 0 to 10% by weight of additives as well as 0 to 10% by weight of colorants or pigments.

The polymer component may alternatively or additionally be based on polymerisation of monomers comprising at least one of the following monomers. Accordingly, the polymer content may be based on polymerisation of monomers comprising at least one of the following monomers: The monomers usual in dental field are suitable as monomers. Radically polymerisable mono-functional monomers such as mono(methyl)acrylate, methyl-, ethyl-, butyl-, benzyl-, furfuryl- or phenyl(meth)acrylate, poly-functional monomers such as poly-functional acrylates or methacrylates, e.g. bisphenol-A di(meth)acrylate, Bis-GMA (an addition product of methacrylic acid and bisphenol-A diglycidylether), UDMA (urethane dimethacrylate), e.g. an addition product of 2-hydroxyethylmethacrylate and 2,2,4-hexamethylene diisocyanate), di-, tri- or tetraethyleneglycol di(meth)acrylate, decanediol di(meth)acrylate, dodecanediol di(meth)acrylate, hexyldecanediol di(meth)acrylat, trimethylolpropane tri(meth)acrylate, pentaerythritol tetra(meth)acrylate as well as butanediol di(meth)acrylate are examples.

At least one urethane (meth)acrylate may be selected from bis(methacryloxy-2-ethoxycarbonylamino)alkylene, diurethane acrylate oligomer, alkyl-functional urethane dimethacrylate oligomers, aromatically functionalized urethane dimethacrylate oligomers, aliphatically unsaturated urethane acrylates, bis(methacryloxy-2-ethoxycarbonylamino)-substituted polyether, aromatic urethane diacrylate oligomers, aliphatic urethane diacrylate oligomers, mono-functional urethane acrylates, aliphatic urethan diacrylates, hexa-functional aliphatic urethane resins, aliphatic urethane triacrylate, UDMA, aliphatic urethane acrylate oligomers, unsaturated aliphatic urethan acrylate.

At least one monomer selected from the following monomers or mixtures thereof may be used as poly-functional monomer: 2,2-bis-4-(3-methacryloxy-2-hydroxypropyl) phenylpropane (bis-GMA), i.e. the reaction product of glycidylmethacrylate and bisphenol-A (containing OH-groups), and 7,7,9-trimethyl-4,13-dioxo-3,14-dioxa-5,12-diazahexadecane-1,16-diyldimethacrylate (UDMA), i.e. the urethane dimethacrylate of 2 mol 2-Hydroxyethylmethacrylate (HEMA) and 1 mol 2-2,4-trimethylhexamethylene diisocyanate (containing urethane groups). In addition, reaction products of glycidylmethacrylate with other bisphenols, such as e.g. bisphenol-B (2,2'-bis-(4-hydroxyphenyl)butane), bisphenol-F (2,2'-methylene diphenol) or 4,4'-Dihydroxydiphenyl, as well as reaction products of 2 mol HEMA or 2-hydroxypropyl(meth)acrylate with, in particular 1 mol, known diisocyanate, such as e.g. hexamethylene diisocyanate, m-xylylene diisocyanate or toluene diisocyanate, are suitable as cross linking monomers.

Diethyleneglycol di(meth)acrylate, decanediol di(meth)acrylate, trimethylolpropane tri(meth)acrylate, pentaerythritol tetra(meth)acrylate as well as butanediol di(meth)acrylate, 1,10-decandio di(meth)acrylate, 1,12-dodecanediol di(meth)acrylate may also be used as poly-functional monomers.

The polymer component may alternatively or additionally be based on polymerisation of monomers comprising at least one of the following monomers. Accordingly, the polymer content may be based on polymerisation of monomers comprising at least one of the following monomers: One or more ethylenically unsaturated compounds with or without acid functionality.

For example acrylic acid esters, methacrylic acid esters, hydroxy-functional acrylic acid esters, hydroxy-functional methacrylic acid ester and combinations thereof. As well as mono-, di- or poly-(meth)acrylate, i.e, acrylate and methacrylate, such as methyl(meth)acrylate, ethylacrylate, isopropylmethacrylate, n-hexylacrylate, stearylacrylate, allylacrylate, glycerin triacrylate, ethyleneglycol diacrylate, Diethyleneglycol diacrylate, triethyleneglycol dimethacrylate, 1,3-propandiole(meth)acrylate, trimethylolpropane triacrylate, 1,2,4-butantriol trimethacrylate, 1,4-cyclohexanediol diacrylate, pentaerythritol tetra(meth)acrylate, sorbithexacrylate, tetrahydrofurfuryl (meth)acrylate, bis[1-(2-acryloxy)]-p-ethoxyphenyldimethylmethane, bis[1-(3-acryloxy-2-hydroxy)]-p-propoxyphenyldimethylmethan, ethoxylated bisphenol-A di(meth)acrylate and trishydroxyethylisocyanurate isocyanurate trimethacrylate, (meth)acrylamides (i.e., acrylamides and methacrylamides), such as (meth)acrylamides, methylene bis(meth)acrylamide and diacetone (meth)acrylamide; urethane (meth)acrylate; the bis-(meth)acrylates of polyethylene glycols (preferably having a molecular weight of 200-500), co-polymerisable mixtures of acrylated monomers, and vinyl compounds such as styrene, diallylphthalate, divinylsuccinate, divinyladipate and divinylphthalate. Other suitable radically polymerisable compounds comprising siloxane-functional (meth)acrylates and fluoropolymer-functional (meth)acrylates or mixtures of two or more radically polymerisable compounds may be used when necessary.

The polymer component may alternatively or additionally be based on polymerisation of monomers comprising at least one of the following monomers. Accordingly, the polymer content may be based on polymerisation of monomers comprising at least one of the following monomers: hydroxyalkyl(meth)acrylates, such as 2-hydroxyethyl(meth) acrylate and 2-Hydroxypropyl(meth)acrylate; glycerin mono- or di(meth)acrylate; trimethylolpropane mono- or di(meth)acrylate; pentaerythritol mono-, di- and tri(meth) acrylate; sorbitol mono-, di-, tri-, tetra- or penta(meth) acrylate and 2,2-bis[4-(2-hydroxy-3-methacryloxypropoxy) phenyl]propane (bis-GMA) or mixtures of ethylenically unsaturated compounds. As well as on PEGDMA (polyethyleneglycol dimethacrylate having a molecular weight of about 400), GDMA (glycerin dimethacrylate), and/or NPGDMA (neopentylglykol dimethacrylate) as well as mixtures containing them.

The composites may contain a polymerisation initiator, for example an initiator for radical polymerisation, for initiation of polymerisation. The mixtures may be polymerisable or have been polymerised cold, cross linked by rays, i.e. UV-cross linked or by heat supply.

Known peroxides may be used as initiators for temperature-induced polymerisation, such as dibenzoyl peroxide, dilauroyl peroxide, tert.-butyl peroctoate or tert.-butyl perbenzoate, but also alpha, alpha'-azo-bis(isobutyroethylester), benzpinacol and 2,2'-dimethylbenzpinacol. For example, benzoin alkylethers or -esters, benzil monoketals, acylphosphine oxide or aliphatic and aromatic 1,2-diketo compounds, such as, for example, 2,2-diethoxyacetophenon, 9,10-phenanthrene quinone, diacetyl, furil, anisil, 4,4'-dichlorbenzil and 4,4'-dialkoxybenzil or camphor quinone are considered as photoinitiators. The photoinitiators are preferably used together with a reducing agent. Amines such as aliphatic or aromatic tertiary amines, for example N,N-dimethyl-p-toluidine or triethanolamine, cyanethylmethylaniline, triethylamine, N,N-dimethylaniline, N-methyldiphenylamine, N,N-dimethyl-sym.-xylidin, N,N-3,5-tetramethylaniline and 4-dimethylamino benzoic acid ethylester or organic phosphites, are examples for reducing agents. Usual photoinitiators are e.g. camphor quinone plus ethyl-4-(N,N-dimethylamino)benzoate, 2-(ethylhexyl)-4-(N,N-dimethylamino)benzoate or KN-dimethylamino ethylmethacrylate. 2,4,6-trimethylbenzoyl diphenylphosphine oxide is particularly well suited as initiator for polymerisation initiated by UV light. UV photoinitiators may be used alone, in combination with an initiator for visible light, an initiator for cold curing and/or an initiator for temperature-induced curing.

Radical-forming systems, e.g. benzoyl or lauroyl peroxide are used together with amines such as N,N-dimethyl-sym.-xylidin or N,N-dimethyl-p-toluidine, as initiators for cold polymerisation. Dual curing systems may also be used, e.g. photoinitiators with amines and peroxides. The initiators are preferably used in amounts of 0.01 to % by weight, based on the total mass of the mixture.

Suitable initiators for cold polymerisation also comprise a redox system comprising a peroxide, and a reducing agent selected from ascorbic acid, ascorbic acid derivatives, barbituric acid or a barbituric acid derivative, sulphinic acid, sulphinic acid derivative, particularly preferred is a redox system comprising (i) barbituric acid or thiobarbituric acid or a barbituric acid derivative or thiobarbituric acid derivative and (ii) at least one copper salt or copper complex and (iii) at least one compound having an ionic halogen atom, particularly preferred is a redox system comprising 1-benzyl-5-phenylbarbituric acid, copper acetylacetonate and benzyldibutyl ammonium chloride. Particularly preferably, the polymerisation in the 2-component dental material is initiated via a barbituric acid derivative.

In the case of cold polymerisation, it may be expedient for the composite material to be divided into two components which are intended to be cured by mixing. It is also possible to provide the material such that it is to be cured by both VIS and/or UV light and by mixing two components.

The inorganic fillers preferably comprise barium aluminum fluorosilicate dental glasses.

The a) 40 to 80% by weight inorganic fillers may preferably comprise 0.5 to 10% by weight non-agglomerated nanofillers having particle sizes of 1 to 50 nm; at least 60% by weight of a mixture of fillers of 50 to 90% by weight coarse- and 10 to 50% by weight fine-grained dental glasses, which have a size ration, based on the average particle size ($d_{50}$ value), of fine-grained to coarse-grained of 1:4 to 1:30, wherein the data in % by weight refers to the total composition of inorganic fillers, optionally, at least one dental glass having a particle size differing from coarse- and fine-grained dental glasses may be contained in the filler component.

Better package of the filler particles and thus a higher filler content may be achieved by a mixture of fillers of coarse- and fine-grained dental glasses, which have a size ratio of 1:4 to 1:30, preferably 1:4 to 1:20, especially approximately 1:5 to 1:10. The higher filler content results in a lower content of shrinkable monomer matrix (see above). The content of fine-grained dental glasses shall maximally amounts to 40% by weight in the total composition of the fillers.

Barium glass powder, preferably barium aluminum fluorosilicate dental glasses and/or strontium glass powder are particularly well suited as dental glasses. Preferably, the average particle size of the coarse-grained dental glasses is 5 to 10 µm, in particular about 7 µm, and that of the fine-grained 0.5 to 2 µm, in particular 1 µm. Further dental glasses which optionally being present have e.g. average grain sizes of 2 to 5 or of 10 to 50 µm. The inorganic filler may therefore have dental glasses having three or more grain fractions in total. They may also contain further, conventional fillers usual in dental field, such as quartz, glass ceramic or mixtures thereof. In addition, the composites may contain fillers for achieving enhanced radiopacity. Preferably, the average particle size of the radioque filler is 100 to 300 nm, in particular 180 to 300 nm. Suitable radiopaque fillers comprise e.g. the fluorides of rare-earth metals described in DE 35 02 594 A1, i.e. the trifluorides of the elements 57 to 71. ytterbium fluoride, in particular ytterbium trifluoride having an average particle size of about 300 nm, is particularly preferably used. Preferably, the amount of the radiopaque filler amounts to 10 to 50% by weight, particularly preferably 20 to 30% by weight, based on the total filler content.

Furthermore, precipitated mixed oxides, such as, for example, $ZrO_2/SiO_2$, may be used as fillers. Mixed oxides having a particle size of 200 to 300 nm and, in particular, approximately 200 nm, are preferred. Preferably, the mixed oxide particles are spherical and have a uniform size. Preferably, the mixed oxides have a refractive index of 1.52 to 1.55. Preferably, precipitated mixed oxides are used in amounts of 25 to 75% by weight and particularly of 40 to 75% by weight.

For example, $SiO_2$, $ZrO_2$, $TiO_2$ and/or $Al_2O_3$ having a particle sizes <50 nm as inorganic fillers may be used as non-agglomerated nanofillers.

The (b) 60 to 20% by weight of at least one polymer component in the composite material are preferably base on polymerisation of a monomer mixture of i. 60-80% by weight TCD-di-HEMA ou TCD-di-HEA and optionally bis-GMA, ii. 10 to 18% by weight UDMA, iii. rest TEDMA and/or at least one threefold, fourfold and/or fivefold cross-linker, and 0 to 1% by weight initiator(s), based on the total composition, Preferably, the TCD-monomer content in the total composition of the dental composite is from 1 to 15% by weight.

The lithium silicate may comprise 50 to 85% by weight silicon dioxide, 10 to 20% by weight $Li_2O$, 0.0 to 15.0% by weight $K_2O$, 0.0 to 8.0% by weight $ZrO_2$, 0.0 to 5.0% by weight $Al_2O_3$, 0.0 to 5.0% by weight MgO, and optionally 0.0 to 10.0% by weight inorganic pigments, in particular oxidic pigments, wherein the total composition of lithium disilicate amounts to 100% by weight.

Preferably, the lithium disilicate may comprise as radiopaque agent a content of one of the fluorides of the rare-earth metals described in DE3502594A1, i.e. the trifluorides of the elements 57 to 71. Ytterbium fluoride, in particular ytterbium trifluoride having an average particle size of about 300 nm, are particularly preferably used fillers. Preferably, the amount of the radiopaque filler amounts to 0.001 to 50% by weight, based on the total content of lithium disilicate, preferably 1 to 30% by weight, particularly preferably 10 to 30% by weight, based on the total content of lithium disilicate.

The hybrid ceramic preferably comprises a ceramic content, wherein the ceramic content preferably is a ceramic scaffold. The ceramic scaffold preferably comprises from 50 to 70% by weight $SiO_2$, from 15 to 30% by weight $Al_2O_3$, from 5 to 15%) by weight $Na_2O$, from 2 to 10% by weight $K_2O$, from 0.05 to 5% by weight $B_2O_3$, rom 0.0001 to 1% by weight $ZrO_2$ and rom 0.0001 to 1% by weight CaO, wherein the total composition amounts to ad. 100% by weight. Particularly preferably, the ceramic scaffold comprises from 55 to 65% by weight $SiO_2$, from 20 to 25% by weight $Al_2O_3$, from 8 to 12% by weight $Na_2O$, from 3 to 7% by weight $K_2O$, from 0.05 to 3% by weight $B_2O_3$, from 0.0001 to 1% by weight $ZrO_2$ and from 0,0001 to 1% by weight CaO, wherein the total composition of the ceramic scaffold amounts to ad. 100% by weight.

The amount of feldspar, in particular the feldspar ceramic, may preferably be from 80 to 95% by weight and the content of polymer, preferably being based on urethane (meth) acrylates and/or (meth)acrylate derivatives, such as UDMA and/or TEGDMA, may preferably be from 5 to 20% by weight, wherein in the total composition of the hybrid ceramic amounts to 100% by weight.

The polymer content in the hybrid ceramic, in particular as polymer component, preferably being based on polymerisation of UDMA (urethane methacrylate) and TEGDMA (triethylene glycol dimethacrylate), wherein preferably the content of the polymer content, in particular as polymer component, is from 2 to 50% by weight, preferably from 10 to 20% by weight, in the total composition of the hybrid ceramic.

The flexural strength of the hybrid materials preferably amounts to at least 140 [Mpa], preferably from 150 to 160 [MPa]. The flexural strength may be determined according to ISO 10477 or according to ISO 6872. The hardness of the hybrid material preferably amounts to about 2.5 [MPa]. The elastic modulus of the hybrid ceramic, preferably the feldspar-containing hybrid ceramic, preferably is in the range of 25 to 35 GPa, preferably at 60 GPa +/−2.5 GPa. The elastic modulus of enamel is at 72.7 to 105.5 GPa and that of dentin at 17.7 to 29.8 GPa. The advantage of hybrid ceramics is that the elastic modulus is between that of natural enamel and natural dentin.

Particularly preferably, the hybrid ceramic comprises a polymer content, in particular as polymer component of 2 to 50% by weight, in particular of 2 to 25% by weight, preferably of 10 to 20% by weight, as well as a ceramic content, in particular of an open-pored ceramic scaffold, of 50 to 98% by weight, in particular of 75 to 98% by weight, based on the total composition (ad. 100% by weight) of the hybrid ceramic, wherein the hybrid ceramic in the content of the polymer component and/or in the ceramic content may contain 0.0 to 8.0% by weight pigments respectively. Preferred ceramic contents comprise zirconium dioxide and/or feldspar. Preferred polymers in the hybrid ceramic are based on reaction of UDMA, HEMA, TEGDMA and/or mixtures containing at least one of the mentioned monomers.

The hybrid ceramic of the outer region of the blank comprises at least one polymer content, in particular as polymer component, for improvement of the processing properties of the blank, wherein the blank has an open-pored ceramic scaffold, which has 2 to 50% by weight of polymer content of at least one polymer, based on the total composition of the dental ceramic blank. The terms polymer, polymer content and polymer component are used synonymously.

According to another embodiment, the blank may have a (iii) dentin scaffold region having the following colours according to colour space L*a*b, according to DIN EN ISO 11664-4, with L 50 to 80, a 2 to 5 and b 15 to 22, and/or an (iv) outer region having the following colours according to colour space L*a*b, in particular according to DIN EN ISO 11664-4, with L 60 to 95, a −5 to 3 and b 3 to 2. Preferably, the dentin scaffold region is made of an opaque material having the afore-mentioned colours and/or the outer region is made of a transparent material having the afore-mentioned colours.

According to an embodiment, it is preferred for the dentin scaffold region to be selected from an afore-mentioned metal oxide or metal oxide mixture, preferably a zirconium oxide, zirconium dioxide aluminum oxide mixture, and the outer region is made of a hybrid ceramic, preferably a zirconium dioxide and/or feldspar, in particular a feldspar ceramic, -containing hybrid ceramic, Advantageously, the dentin scaffold region and the outer region may be glued together by a bonding.

The outstanding advantages of hybrid ceramics as an outer region over pure ceramics are the lower hardness, the shorter milling times and/or the elastic modulus, which usually is between that of the enamel and that of the dentin. Usually, Vickers hardness (HV5) of a zirconium dioxide ceramic ($ZrO_2$ 88 to 96% by weight; $HfO_2$ 1 to 5% by weight, $Y_2O_3$ with 4 to 6% by weight and less than 0.50% by weight $Al_2O_3$ as well as further metal oxides less than 0.25% by weight, such as $Fe_2O_3$ and/or $Na_2O_3$, wherein the total composition amounts to 100% by weight) is over 1200 [MPa], in particular without open porosity, as well as an e-modulus of greater 200000 [MPa]. For the above reasons, a standard milling time of ceramics, for example, of about 148 minutes (normal mode) or 132 minutes (fast mode) may be reduced to below 10 (normal mode) and below 6 minutes (fast mode) for exemplified crowns. A hybrid ceramic is therefore also referred to as elastic ceramic due to the achievable elastic modulus. The hybrid ceramic is less susceptible due to the polymer content. In addition, Moreover, the attrition effect on the antagonists enamel is lower and thus better in long-term use for the opposing natural tooth. Adjustment of the colour may be carried out significantly more nature-identical due to the use of liquid monomers for the production of the polymer content. Likewise, a significantly more natural appearance and warm colour tone may be achieved by choice of material layers and/or colour layers due to the layered structure of the blank. A hybrid ceramic as an outer area may be polished more quickly at the dentist.

Another subject matter of the invention is a method for the production of a dental blank as well as a blank obtainable according to the method, wherein a dental prosthetic restoration preferably is obtainable from the blank by (material-) removing processing, wherein the blank is produced by (i) providing an inner connecting element having a scaffold region, in particular a peg-shaped scaffold region, in the direction of the coronal region of the blank and an implant connection geometry in the radicular direction of the blank, and (ii) connecting the scaffold region of the inner connecting element to a dentin scaffold region in the direction of the coronal region of the blank, in particular the scaffold region is connected to the dentin scaffold region in a non-detachable manner, preferably the scaffold region is connected to the dentin region in a positive locking, force-fitted, firmly bonded or, according to a combination, positive locking and/or force/fitted and/or firmly bonded manner, and (iii) connecting the dentin scaffold region to an (iv) outer region of the blank in the direction of the coronar region of the blank, in particular the dentin scaffold region is connected to the outer region in a non-detachable manner, preferably the dentin scaffold region is connected to the outer region in a positive locking, force-fitted, firmly bonded or, according to a combination, positive locking and/or force/fitted and/or firmly bonded manner, and (v) the dental blank having an elongated lumen within the implant connection geometry of the inner connecting element and, optionally, within the scaffold region of the inner connecting element, which extends from the top side to the bottom side of the implant connection geometry of the inner connecting element and, optionally, from the top side to the bottom side of the scaffold region of the inner connecting element, and the lumen having an opening in crestal or lingual direction and an opening in radicular direction. Particularly preferably, the lumen extends from the top side of the outer region to the bottom side of the implant connection geometry.

According to a preferred alternative, (iii) the dentin scaffold region may comprise one or more layers of a metal oxide or a metal oxide mixture, wherein the several layers preferably have different colours according to colour space L*a*b. According to an embodiment, the overall impression of the dental blank comprising the inner connecting element, the dentin scaffold region and the outer region is set to Vita classical colour key/Vita classical shade guide A1 to D4. In this context, the colours correspond to A1 to A4 (reddish-brownish), B1 to B4 (reddish-yellowish), C1-C4 (grey shades), D2-D4 (reddish-grey).

According to the invention, it is thereby preferred for the overall impression of all colour layers to have L 50 to 80, a 2 to 5 and b 15 to 22 of colour space L*a*b in the dentin scaffold region and/or L 60 to 95, a −5 to 3 and b 3 to 2 of colour space L*a*b in the outer region.

According to a preferred alternative, the dentin scaffold region may have one to five layers of a metal oxide or a metal oxide mixture as well as, optionally, pigments. The layer thicknesses, each independently of each other, may be from 200 µm to 5 mm, in particular from 200 µm to 1 mm, preferably from 0.5 mm to 1 mm. Particularly preferably, the one to five layers completely enclose the outer scaffold region which, for example, is made of a titanium alloy.

The dentin scaffold region, in particular the respective layers of the dentin scaffold region, preferably each independently from each other, have pigments. Usually, the pigments have a particle size of $d_{90}$ less than 20 µm to less than 15 µm and also less than 10 µm. Typically, $d_{50}$ of the pigment particles is about 0.001 to 10 µm. Usual inorganic pigments may be used as inorganic pigments. Inorganic pigments substantially being colour stable beyond 850° C., preferably up to 1200° C., are suitable for the production of the dentin scaffold region. Thus, the inorganic pigments preferably have a colour stability beyond 850° C., in particular from 850 to 1050° C., preferably from 900 to 930° C., The respectively selected pigment, according to the one or more layers of a metal oxide or a metal oxide mixture in the dentin scaffold region, is preferably selected from oxides, hydrated oxides, sulfides, sulfates, carbonates and silicates of the transition metals, such as preferably pigments comprising zirconium and/or iron. Known pigments comprise zirconium silicates, iron silicates, manganese oxides, chromium oxide, $\gamma$-$Fe_2O_3$, $Fe_3O_4$/$Fe_2O_3$, $Cr_2O_3$, $TiO_2$. Moreover, the inorganic pigments may comprise coloured pigments, gloss pigments, metallic effect pigments, in particular gloss pigments having platelike or scalelike metal particles, such as iron oxide red, strontium yellow, aluminum or silver bronzes, pearlescent pigments or gold bronze, aluminum bronze.

Particularly preferred inorganic coloured pigments comprise iron oxide, zirconium praseodymium silicate (Zr,Pr)$SiO_4$ (CAS-No: 68187-15-5), zirconium iron silicate (Zr,Fe)$SiO_4$ (CAS-No: 68412-79-3), zinc iron chromite brown spinel (Zn,Fe)(Fe,Cr)$_2O_4$ (CAS-Nr.: 68186-88-9), Chrome tin pink sphene $CaO$:$SnO_2$.$SiO_2$.$Cr_2O_3$ (CAS-Nr.: 68187-12-2).

According to a further embodiment variant, in the method, in the blank as well as in the system for the production of the blank, (ii) the scaffold region and the dentin scaffold region may have a geometric indexing on their opposite inner surfaces, preferably in order to make the scaffold region and the dentin scaffold region connectable in a defined position and, optionally, (iii) the dentin scaffold region and the outer region may have a geometric indexing on their opposite inner surfaces, preferably in order to make the dentin scaffold region and the outer region connectable in a defined position. The indexing preferably corresponds to a complementary structure of the opposite inner surfaces, complementary structuring of the surfaces, such as, for example, at least one protrusion, and at least one complementary recess.

Moreover, in the method, it is preferred for the (ii) scaffold region and the dentin scaffold region to be connected to each other in a positive locking, force-fitted, firmly bonded or, according to an alternative, positive locking and/or force-fitted and/or firmly bonded manner, and/or (iii) the dentin scaffold region and the outer region to be connected to each other in a positive locking, force-fitted, firmly bonded or, according to an alternative, positive locking and/or force-fitted and/or firmly bonded manner.

According to the invention, an open-pored ceramic scaffold, in particular a sintered scaffold, is infiltrated by at least one monomer, optionally by polymerisation initiator(s). Subsequent to infiltration and polymerisation into polymers, the ceramic scaffold has improved material properties. The material thus produced is a dental hybrid ceramic. Infiltration of the open-pored ceramic scaffold may be carried out in a bath comprising the at least one monomer, optionally with polymerisation inhibitor(s). Subsequently, polymerisation of a liquid infiltrated monomer or a monomer mixture may be carried out.

Likewise, a subject matter of the invention is a system for the production of a dental blank, wherein the system comprises a) an inner connecting element, a dentin scaffold region and an outer region as single components connectable to each other, or b) a blank according to the invention and, preferably, an adhesive, a plastic or liquid hybrid material for firmly bonded connection and/or an implant screw.

The respective lumen is designed in the connecting element, dentin scaffold region, outer region or in the blank for receiving of a connecting screw in order to be able to fasten the prosthetic restoration with an implant or an abutment on an implant.

According to a further alternative, the system may comprise an adhesive, a plastic or liquid hybrid material for firmly bonded connection and/or an implant screw.

According to a further alternative, a subject matter of the invention is the use of a blank or of a system for the production of a multi-coloured dental prosthetic restoration, in particular an implant-supported single-tooth restoration, such as a crown, in a material-removing process.

In the following, the invention is illustrated in more detail on the basis of the schematic figures without limiting the invention to these embodiments.

Figure 1A:
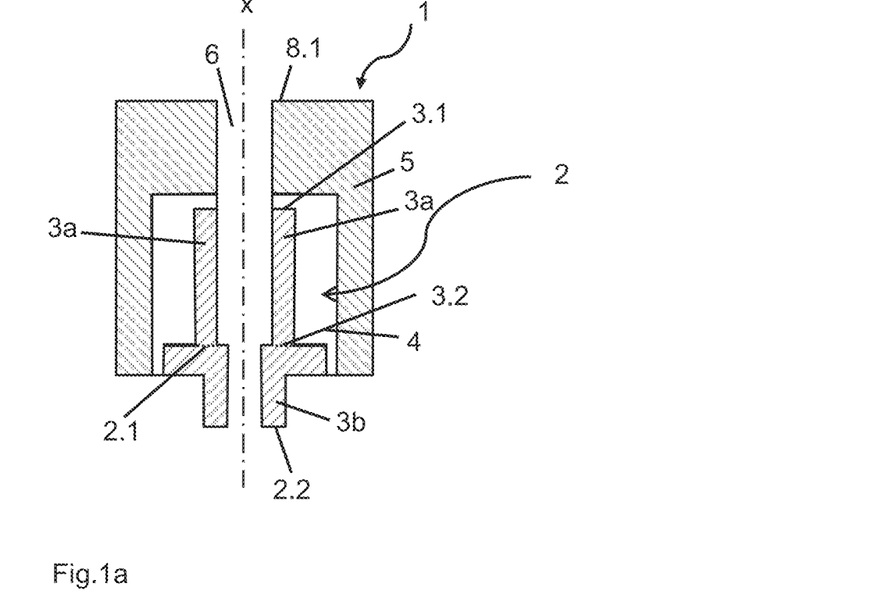
Figure 3:
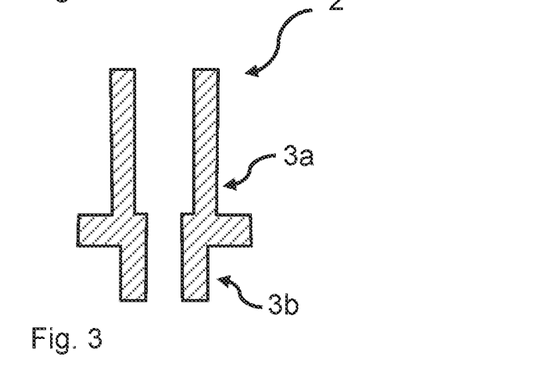

FIG. 1a shows a blank 1 according to the invention with an inner connecting element 2, see also FIG. 3, having a scaffold region 3a and an implant connection geometry 3b as well as a dentin scaffold region 4 and an outer region 5. The outer region 5 is processed in a material-removing process such that the region takes the contour of at least one tooth surface of a single-tooth restoration, such as a crown. The elongated straight lumen 6 has a longitudinal axis (x). The lumen extends until the outer region. The blank has an elongated lumen 6 in the implant connection geometry 3b and in the scaffold region 3a which extends from the top side 2.1 to the bottom side 2.2 of the implant connection geometry 3b and from the top side 3.1 to the bottom side 3.2 of the scaffold region 3a and has an opening in crestal direction and an opening in radicular direction. Moreover, the elongated lumen 6 extends from the top side 8.1 of the outer region 5 to the bottom side 2.2 of the implant connection geometry 3b.

Figure 1B:
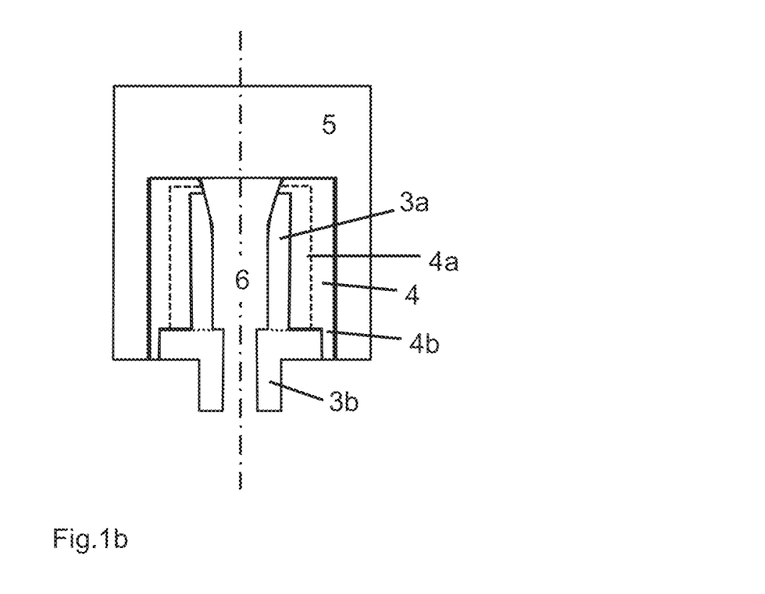

In FIG. 1b, a blank is shown whose lumen 6 does not extend into the outer region 5. The lumen 6 may be widened crestalwards in the dentin scaffold region 4 and optionally in the scaffold region 3a and may be milled in the outer region in the future milling process. Preferably, the lumen is cylindrical at least in the region of the implant connection geometry 3b. In FIG. 1b, the dentin scaffold region 4 has two layers 4a and 4b.

Figure 1C:
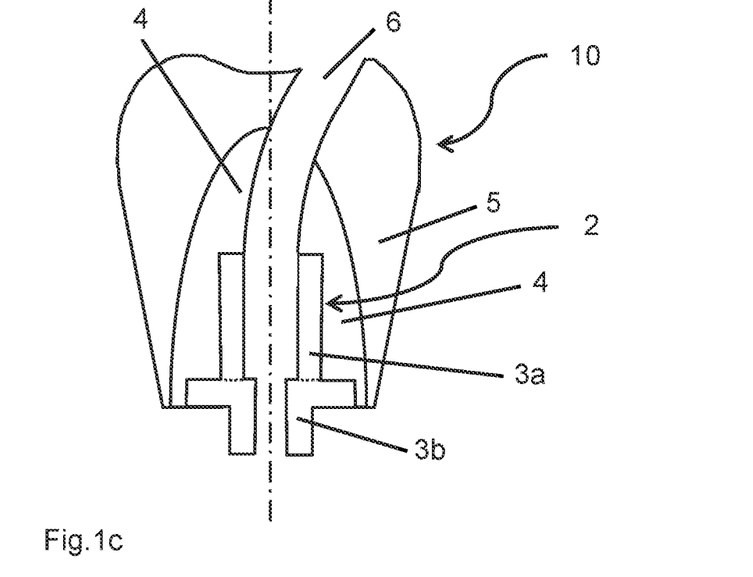

FIG. 1c shows a processed blank according to the invention with an inner connecting element 2 having a scaffold region 3a and an implant connection geometry 3b as well as a dentin scaffold region 4 and an outer region 5, which has been processed in a material-removing process and takes the contour of at least one tooth surface of a prosthetic single-tooth restoration 10. The elongated lumen 6 in the blank is arched lingualwards in the outer region 5. The blank of FIG. 1c had a lumen in the scaffold region before processing. The lumen in the dentin scaffold region and in the outer region 5 has been produced in material-removing process, in particular milled. Alternatively, the blank may have an elongated lumen being accordingly arched lingualwards. In this case, the blank carries a reference on its outside in order to determine the lingual side of the prosthesis to be produced, prior to drilling.

Figure 2:
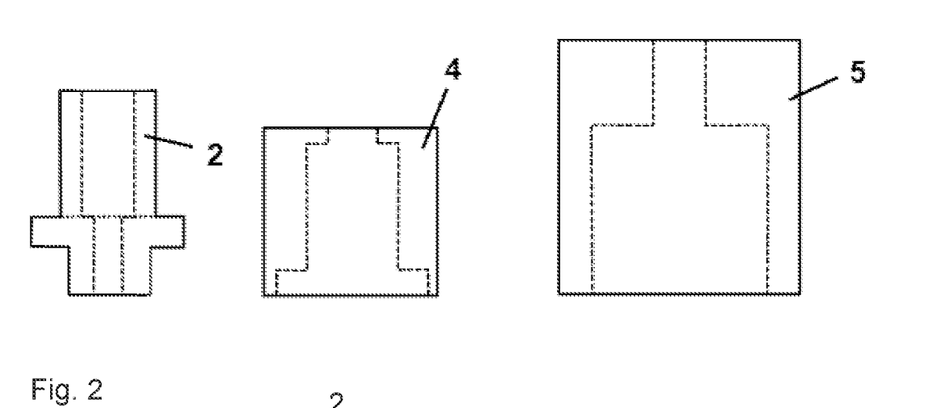

FIG. 2 shows a system according to the invention for the production of a dental blank 1 comprising single components being connectable to each other: inner connecting element 2, dentin scaffold region 4 and outer region 5.

The blank according to the invention may then preferably be used in an automated milling process with a significantly reduced material scrap, since fracture strength and E-modulus will make the blank significantly better survive milling processing without chipping of parts of the blank during the milling process.

The invention claimed is:

1. A dental blank (1) for the production of a dental prosthetic restoration (10) by material-removing processing, comprising:
   an inner connecting element (2) having a scaffold region (3a) in the direction of the coronal region of the dental blank and having an implant connection geometry (3b) in the radicular direction of the dental blank;
   (ii) wherein the scaffold region (3a) of the connecting element (2) is connected to a dentin scaffold region (4) in the direction of the coronal region of the blank; (1), and
   (iii) the dentin scaffold region (4) is connected to (iv) an outer region (5) of the blank in the direction of the coronal region of the blank (1), and
   (v) the dental blank has an elongated lumen (6) within the implant connection geometry (3b) of the inner connecting element (2), which extends from the top side (2.1) to the bottom side (2.2) of the implant connection geometry (3b) of the inner connecting element (2), and the lumen has an opening in crestal or lingual direction and an opening in radicular direction, wherein the outer region (5) of the blank is made of a dental hybrid ceramic comprising polymer content and ceramic content wherein the hybrid ceramic comprises ceramic content, wherein the ceramic content is a ceramic scaffold, wherein the ceramic scaffold comprises from 50 to 70% by weight $SiO_2$, from 15 to 30% by weight $Al_2O_3$, from 5 to 15% by weight $Na_2O$, from 2 to 10% by weight $K_2O$, from 0.05 to 5% by weight $B_2O_3$, from 0.0001 to 1% by weight $ZrO_2$, and from 0.0001 to 1% by weight CaO, wherein the total composition amounts to 100% by weight.

2. The blank according to claim 1, wherein the dental blank (1) comprises an elongated lumen (6) which extends from the top side (8.1) of the outer region (5) to the bottom side (2.2) of the implant connection geometry (3b) of the connecting element (2), and the lumen (6) extends through the inner connecting element (2), the dentin scaffold region (4) and the outer region (5) and has an opening in crestal or lingual direction and an opening in radicular direction.

3. The blank according to claim 1, wherein the dental blank (1) comprises an elongated lumen (6) which extends from the top side (8.1) of the outer region (5) to the bottom side (2.2) of the implant connection geometry (3b) of the connecting element (2), wherein the elongated lumen a) has at least one longitudinal axis, (b) the elongated lumen is angled and has at least two intersecting longitudinal axes, (c) the elongated lumen (6) is arched and/or (d) the opening of the elongated lumen in crestal or lingual direction has at least a greater diameter than the opening at the bottom side (2.2) of the implant connection geometry (3b) of the inner connecting element (2) in radicular direction.

4. The blank according to claim 1, wherein (i) the inner connecting element (2) comprising the scaffold region (3a) and the implant connection geometry (3b) is made of at least one metal or one metal alloy.

5. The blank according to claim 1, wherein (iii) the dentin scaffold region (4) is made of a metal oxide or metal oxide mixture.

6. The blank according to claim 1, wherein (iii) the dentin scaffold region (4) is made of a metal oxide or metal oxide mixture, and is selected from zirconium oxide, aluminum oxide or a zirconium oxide/aluminum oxide mixture, wherein the metal oxide or metal oxide mixture optionally has magnesium oxide (MgO) content and/or ytterbium oxide ($Y_2O_3$) content.

7. The blank according to claim 1, wherein (iv) the outer region (5) of the blank is made of a dental composite material or a dental glass ceramic.

8. The blank according to claim 1, wherein the (iv) outer region has a hybrid ceramic comprising from 50 to 98% by weight of a ceramic scaffold as well as 2 to 50% by weight of polymer content, wherein the total composition of the hybrid ceramic amounts to 100% by weight.

9. The blank according to claim 1, wherein the (iv) outer region has a hybrid ceramic comprising a ceramic scaffold, which comprises a zirconium oxide content of 50 to 99.9% by weight, and at least one other metal oxide content, metalloid oxide and/or silicon carbide or mixtures thereof having a content of 0.1 to 50% by weight, wherein the metals of the other metal oxide, metalloid oxide and/or silicon carbide are selected from yttrium, aluminum, magnesium, potassium, calcium, lithium and silicon, wherein the total composition of the ceramic scaffold amounts to 100% by weight.

10. The blank according claim 1, wherein (iv) the outer region (5) of the dental blank (1) is made of:
A) a dental composite material comprising:
   (a) 40 to 80% by weight inorganic fillers,
   (b) 60 to 20% by weight polymer component being based on polymerisation of at least one monomer or one monomer mixture comprising urethane (meth) acrylate, tricyclo[5.2.1.02.6]decane (TCD) urethane derivative, TCD-di-HEA, TCD-di-HEMA, TEGDMA, or
B) a lithium silicate as dental glass ceramic, or
C) a hybrid ceramic having 2 to 25% by weight polymer content and a ceramic content of 75 to 98% by weight, based on the total composition of the hybrid ceramic, wherein the hybrid ceramic contains 0.0 to 8.0% by weight pigments in the polymer content and/or in the ceramic content respectively.

11. The blank according to claim 1, wherein:
(iii) the dentin scaffold region (4) of the blank has the following colours according to colour space L*a*b L 50 to 80, a 2 to 5 and b 15 to 22, and/or
(iv) the outer region (5) of the blank has the following colours according to colour space L*a*b L 60 to 95, a −5 to 3 and b 3 to 2.

12. The dental blank according to claim 1, wherein the dental blank has an elongated lumen (6) within the implant connection geometry (3b) of the inner connecting element (2) and within the scaffold region (3a) of the inner connecting element (2), which extends from the top side (2.1) to the bottom side (2.2) of the implant connection geometry (3b) of the inner connecting element (2) and from the top side (3.1) to the bottom side (3.2) of the scaffold region (3a) of the inner connecting element (2), and the lumen has an opening in a crestal or lingual direction and an opening in a radicular direction.

13. A method for producing a dental blank according to claim 1, the method comprising:
providing an inner connecting element (2) having a scaffold region (3a) in the direction of the coronal region of the blank and an implant connection geometry (3b) in the radicular direction of the blank, and
(ii) connecting the scaffold region (3a) of the inner connecting element (2) to a dentin scaffold region (4) in the direction of the coronal region of the blank (1), and
(iii) connecting the dentin scaffold region (4) to an (iv) outer region (5) of the blank in the direction of the coronal region of the blank (1), and wherein (v) the dental blank having an elongated lumen (6) within the implant connection geometry (3b) of the inner connecting element (2), and the lumen extending from the top side (2.1) to the bottom side (2.2) of the implant connection geometry (3b) of the inner connecting element (2), and the lumen having an opening in crestal or lingual direction and an opening in radicular direction, wherein the outer region (5) of the blank is made of a dental hybrid ceramic comprising polymer content and ceramic content wherein the hybrid ceramic comprises ceramic content, wherein the ceramic content is a ceramic scaffold, wherein the ceramic scaffold comprises from 50 to 70% by weight $SiO_2$, from 15 to 30% by weight $Al_2O_3$, from 5 to 15% by weight $Na_2O$, from 2 to 10% by weight $K_2O$, from 0.05 to 5% by weight $B_2O_3$, from 0.0001 to 1% by weight $ZrO_2$, and from 0.0001 to 1% by weight $CaO$, wherein the total composition amounts to 100% by weight.

14. The method according to claim 13, wherein the (ii) scaffold region (3) and the dentin scaffold region (4) have a geometric indexing on their opposite inner surfaces in order to make the scaffold region (3) and the dentin scaffold region (4) connectable in a defined position and (iii) the dentin scaffold region (4) and the outer region (5) have a geometric indexing on their opposite inner surfaces in order to make the dentin scaffold region (4) and the outer region (5) connectable in a defined position.

15. The method according to claim 13, wherein the (ii) scaffold region (3) and the dentin scaffold region (4) are connectable to each other in a positive locking, force-fitted and/or firmly bonded manner and/or (iii) the dentin scaffold region (4) and the outer region (5) are connectable to each other in a positive locking, force-fitted and/or firmly bonded manner.

16. The method according to claim 13, wherein the dental blank having an elongated lumen (6) within the implant connection geometry (3b) of the inner connecting element (2) and within the scaffold region (3a) of the inner connecting element (2), and the lumen extending from the top side (2.1) to the bottom side (2.2) of the implant connection geometry (3b) of the inner connecting element (2) and from the top side (3.1) to the bottom side (3.2) of the scaffold region (3a) of the inner connecting element (2), and the lumen having an opening in a crestal or lingual direction and an opening in a radicular direction.

17. A system for producing a dental blank according to claim 1, wherein the system comprises
as single components connectable to each other:
an inner connecting element (2) having a scaffold region (3a) in the direction of the coronal region of the blank and an implant connection geometry (3b) in the radicular direction of the blank,
a dentin scaffold region (4), to which the scaffold region (3a) of the connecting element (2) is connectable in the direction of the coronal region of the blank, and
an outer region (5), to which the dentin scaffold region (4) is connectable in the direction of the coronal region of the blank (1),
wherein the dental blank has an elongated lumen (6) within the implant connection geometry (3b) of the inner connecting element (2), which extends from the top side (2.1) to the bottom side (2.2) of the implant connection geometry (3b) of the inner connecting element (2), and the lumen has an opening in crestal or lingual direction and an opening in radicular direction, wherein the outer region (5) of the blank is made of a dental hybrid ceramic comprising polymer content and ceramic content wherein the hybrid ceramic comprises ceramic content, wherein the ceramic content is a ceramic scaffold, wherein the ceramic scaffold comprises from 50 to 70% by weight $SiO_2$, from 15 to 30% by weight $Al_2O_3$, from 5 to 15% by weight $Na_2O$, from 2 to 10% by weight $K_2O$, from 0.05 to 5% by weight $B_2O_3$, from 0.0001 to 1% by weight $ZrO_2$, and from 0.0001 to 1% by weight CaO, wherein the total composition amounts to 100% by weight.

18. The system according to claim 17, wherein the system comprises an adhesive, a plastic or liquid hybrid material for firmly bonded connection and/or an implant screw.

19. The system according to claim 1, wherein the dental blank has an elongated lumen (6) within the implant connection geometry (3*b*) of the inner connecting element (2) and within the scaffold region (3*a*) of the inner connecting element (2), which extends from the top side (2.1) to the bottom side (2.2) of the implant connection geometry (3*b*) of the inner connecting element (2) and from the top side (3.1) to the bottom side (3.2) of the scaffold region (3*a*) of the inner connecting element (2), and the lumen has an opening in a crestal or lingual direction and an opening in a radicular direction.

20. A use of a blank according to claim 1 for the production of a multi-coloured dental prosthetic restoration (100) in a material-removing process.

\* \* \* \* \*

UNITED STATES PATENT AND TRADEMARK OFFICE
CERTIFICATE OF CORRECTION

| | |
|---|---|
| PATENT NO. | : 11,273,018 B2 |
| APPLICATION NO. | : 16/330558 |
| DATED | : March 15, 2022 |
| INVENTOR(S) | : Uwe Böhm and Mario Beyer |

It is certified that error appears in the above-identified patent and that said Letters Patent is hereby corrected as shown below:

In the Specification

In Column 9, Line 29, the line reads:
(N,N-dimethylamino)benzoate or KN-dimethylamino ethyl- This line should read:
(N,N-dimethylamino)benzoate or N,N-dimethylamino ethyl- Signed and Sealed this
Eighteenth Day of July, 2023

Katherine Kelly Vidal
*Director of the United States Patent and Trademark Office*